United States Patent [19]

Hubert et al.

[11] Patent Number: 4,758,957
[45] Date of Patent: Jul. 19, 1988

[54] SPACECRAFT STABILIZATION SYSTEM AND METHOD

[75] Inventors: Carl H. Hubert, East Windsor; Paul A. Miller, Hamilton, both of N.J.

[73] Assignee: General Electric Company, East Windsor, N.J.

[21] Appl. No.: 735,260

[22] Filed: May 17, 1985

[51] Int. Cl.[4] .......................... G05D 1/10; B64G 1/38
[52] U.S. Cl. .................................. 364/434; 364/459; 244/169
[58] Field of Search .............. 364/434, 459, 424; 244/164, 165, 169–172

[56] References Cited

U.S. PATENT DOCUMENTS

| | | | |
|---|---|---|---|
| 3,681,583 | 8/1972 | Kubo et al. | 364/434 |
| 3,705,977 | 12/1972 | Folgate | 364/434 |
| 3,765,621 | 10/1973 | Shigehara | 364/434 |
| 3,866,025 | 2/1975 | Cavanagh | 364/434 |
| 3,940,096 | 2/1976 | Keigler et al. | 244/165 |
| 3,944,172 | 3/1976 | Becker | 244/169 |
| 4,071,211 | 1/1978 | Muhlfelder et al. | 364/434 |
| 4,306,692 | 12/1981 | Kaplan et al. | 244/165 |
| 4,370,716 | 1/1983 | Amieux | 364/434 |
| 4,386,750 | 6/1983 | Hoffman | 244/170 |
| 4,471,926 | 9/1984 | Steel | 244/169 |

Primary Examiner—Errol A. Krass
Assistant Examiner—Thomas G. Black
Attorney, Agent, or Firm—Clement A. Berard, Jr.

[57] ABSTRACT

A method and system is described for simultaneously precessing and nutation damping a spinning spacecraft that includes a computer, thrusters for precession and nutation damping and gyros aligned with or parallel to each of three orthogonal axes with the x-axis being the spin axis. The gyro information from three orthogonal axes is used to compute the momentum vector and target vector. The error vector is computed from the computed momentum vector and target vector. When the error vector's component along a given axis orthogonal to the x-axis changes sign, the thrusters are fired to apply corrective torques according to a computed control error.

5 Claims, 5 Drawing Sheets

SPACECRAFT STABILIZATION SYSTEM AND METHOD

This invention relates to a system and method for separating a spacecraft from a launch vehicle such as the U.S. Space Transportation System (STS) more commonly referred to as the Space Shuttle or Orbiter, and in particular to precession and simultaneous nutation damping of a spinning spacecraft using an inertial reference.

The advent of the (STS) introduced new requirements and conditions for the launching of spacecraft. With few exceptions, these spacecraft will be transferred from the Space Shuttle's orbit to an orbit with a different inclination and/or a different altitude. Several methods to eject and separate spacecraft from the Orbiter have been described. These methods depend on the spacecraft's size, mass, configuration and mission. Small spacecraft with limited attitude requirements will simply be spring ejected with sufficient separation velocity to avoid collision or contact with any part of the Orbiter. Somewhat larger spacecraft will employ the Perigee Assist Module—Delta (PAM-D) or the Perigee Assist Module—Atlas (PAM-A), both of which use electrically driven spin tables to impart inertial attitude stability to the spacecraft/perigee stage assembly. A "Frisbee" technique has been used to separate large cylindrical spacecraft from the Space Shuttle (for example, the LEASAT spacecraft). Very large spacecraft have used the Inertial Upper Stage (IUS), which has its own fully autonomous three-axis attitude reference and control capability. In addition, the Space Shuttle's Remote Manipulator Arm, an articulated boom operated by the Orbiter crew, has been used to remove payloads from the Orbiter's cargo bay and to release them as "free-flying vehicles."

Each of these deployment methods for sizeable spacecraft employs mechanisms that ensure safe separation from the Orbiter while maintaining an attitude reference initially supplied by the Orbiter. For the PAM-D and PAM-A, these mechanisms include a spin table as part of the support cradle. The PAM-A deployment mechanism also includes payload reorientation system where the payload is pivoted out of the bay. To be able to pivot, this reorientation system requires additional Orbiter payload bay length—beyond that required by spacecraft/perigee stage assembly. The IUS, although not requiring a spin table mechanism, also has a support cradle that includes an erection system. The present invention eliminates both the spin table mechanism and the erection system. The resulting deployment system is less complex, less massive, and occupies less of the Orbiters's payload bay.

SUMMARY OF THE PRESENT INVENTION

A method is disclosed for simultaneously precessing and nutation damping a spinning spacecraft that includes a computer, thrusters for precession and nutation damping, and gyros aligned with or parallel to each of three orthogonal axes with the x-axis being the nominal spin axis. The method comprises the repeatedly applied steps of processing the gyro information from the three axes to compute the angular momentum vector and the target vector A. The control error is computed from the computed momentum vector and target vector. When the error vector along a given one of the axes orthogonal to the x-axis changes sign, thrusters are fired to apply a corrective torque according to the computed control error.

DESCRIPTION OF THE PREFERRED EMBODIMENT

Figure 1:
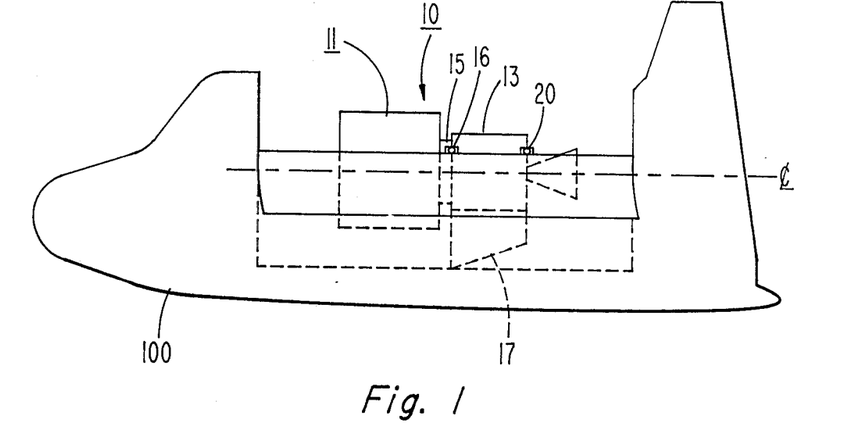
FIG. 1 illustrates the satellite/perigee stage assembly and cradle assembly in the Shuttle's cargo bay according to one embodiment of the present invention.

FIG. 1 illustrates the satellite/perigee stage assembly 10 mounted in the cargo bay of the Shuttle Orbiter 100. The satellite/perigee stage assembly 10 comprises a satellite 11 and a perigee stage 13 connected end to end to each other using a standard Marmon clamp 15. The satellite is the desired payload in final orbit and includes thrusters for attitude and spin control, an apogee motor, solar panels, batteries, communication systems, propellant tanks, etc. The perigee stage includes the perigee motor, payload attachment assembly and aft support assembly. The satellite/perigee stage assembly 10 is mounted to the Shuttle via a standard cradle assembly 17 shown in more detail in FIG. 2.

Figure 2:
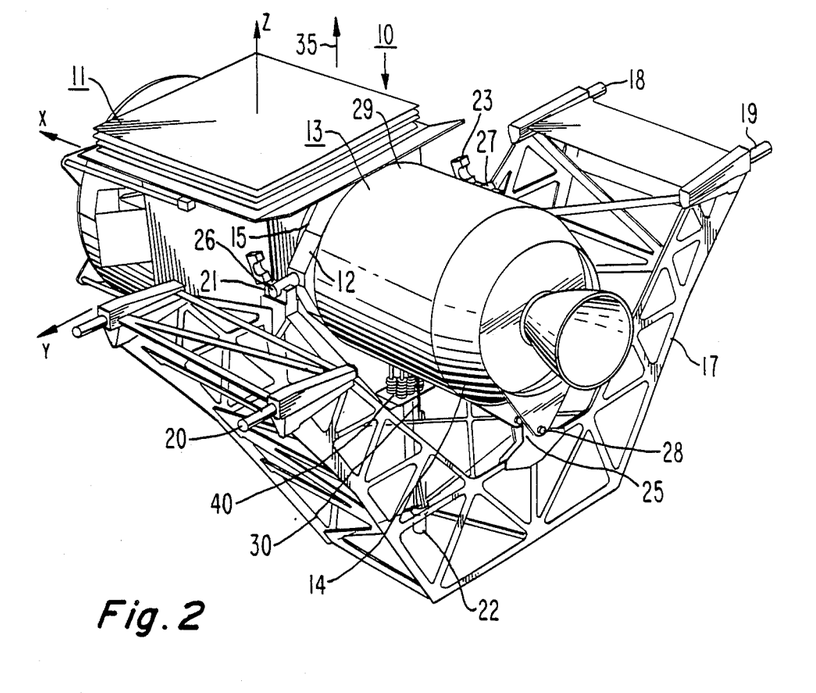
FIG. 2 illustrates in more detail the satellite/perigee stage assembly on the cradle assembly.

The cradle assembly 17 is generally a U-shaped truss network that includes trunnions and a keel fitting 22 for mounting the cradle assembly in the Shuttle's cargo bay. The cradle assembly is clamped to the Shuttle longerons at trunnions 16, 18, 19 and 20. The cradle assembly 17 is typically reusable. After the spacecraft has been launched, the cradle assembly 17 remains in the cargo bay and is returned to earth.

The satellite/perigee stage assembly 10 is attached to the cradle assembly 17 using releasable latches at the clamp points 21, 23 and 25. These latches are remotely controlled so that they can be opened for launching the satellite. The satellite is launched from the Shuttle by springs 40. For more details, see the copending application of J. E. Petersen et al., assigned to the same assignee and filed concurrently herewith.

The satellite's attitude control equipment includes a computer, thrusters and sensors. The satellite also has spin thrusters for spinning up the satellite and gyros aligned with or parallel to each of the three orthogonal axes.

Figure 3:
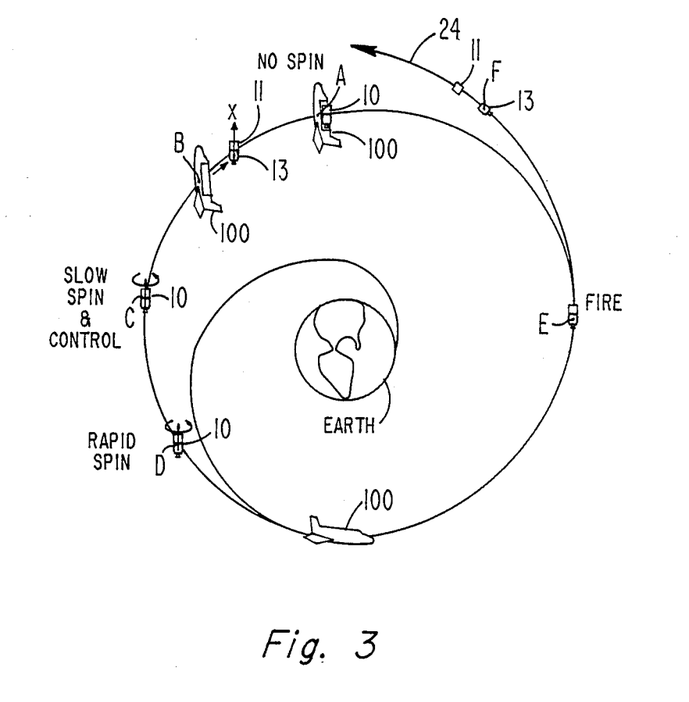
FIG. 3 illustrates the launching sequence.

Referring to FIG. 3, the Shuttle 11 is maneuvered so that at position A in FIG. 3 the Shuttle and the assembly 10 have the desired attitude for firing the perigee motor 13 that places the satellite 11 into the desired transfer orbit 24. When the Shuttle is in the proper position and orientation, the gyro on each of the satellite's three orthogonal axes (x, y and z in FIG. 2) is initialized (that is, calibrated with a fixed known angular rate bias) and the attitude determination algorithms in the satellite's computer is initialized. The satellite's control system will return the satellite/perigee stage assembly 10 to this initial attitude after the assembly is ejected from the Shuttle. (The initial attitude is also referred to below as target attitude.) Prior to initializing the gyros and the attitude algorithm in the satellite's computer, the gyros are actuated and differences between the change in the Shuttle's attitude as measured by it's equipment and the attitude changes measured by the satellite are compared to determine or sense any drift errors in the gyros.

Figure 4:
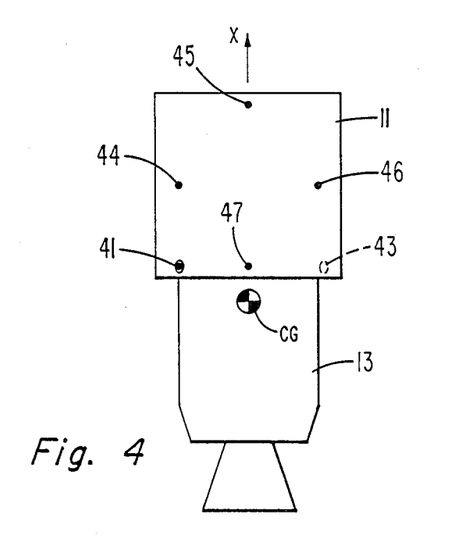
FIG. 4 illustrates the position of the thrusters for controlling and spinning up of the satellite/perigee stage assembly according to one embodiment of the present invention.

At a later point B in FIG. 3, the springs 40 eject the satellite/perigee stage assembly 10 from the cargo bay 100 in the direction 35 along the z axis shown in FIG. 2. The assembly 10 is ejected essentially without spin, although a slow tumble may be present due to, for example, imperfections in the ejection mechanism. Once the satellite/perigee stage assembly 10 is a safe distance from the Shuttle, thrusters 41 and 43 on opposite sides of the satellite's body (see FIG. 4) apply torques to slowly spin the assembly (for example, at 8 degrees per second) about the desired spin axis X as indicated at point C. Although a slow spin provides less axis rigidity than a more rapid spin, a slow spin does not overload the gyros. Once in this slow spin state, the assembly's nutation is coarsely damped using thruster pulses. The satellite's computer determines both the magnitude and timing of the nutation damping thruster pulses by processing gyro information.

Once the nutation angle is reduced to an acceptable level (for example, to below 2 degrees), the satellite's computer fires thrusters (such as thrusters 44-47) to coarsely align the assembly's spin axis with the target attitude. Following this coarse precession maneuver (which is performed without active nutation control), a fine control systemthat combines precession and nutation damping closely aligns the satellite/perigee stage assembly's spin axis with the target direction. The system that provides simultaneous precession and nutation damping will be described later. Once the proper attitude is achieved, as illustrated at position D in FIG. 3, the spin thrusters spin the assembly up to the proper spin rate for firing the perigee motor (that is, to a rate of approximately 35 to 65 rpm). At this higher rate, the gyros may be overloaded and no longer useful, but because of the attitude stability provided by the greater angular momentum, the gyros are also no longer needed.

When the rapidly spinning satellite/perigee motor assembly 10 reaches position E, the perigee motor is fired. Once the perigee motor has burned-out, the Marmon clamp 15 is released and the perigee stage 13 separates from the satellite 11 as indicated at point F. When the satellite reaches the transfer orbit's apogee, the satellite's apogee motor is fired to place the satellite in its final orbit. The system described above is preferably used in placing a satellite in geosynchronous orbit but can be used in launching any spacecraft from a launch vehicle such as the shuttle.

The process for simultaneous precession and nutation damping while the satellite/perigee stage assembly is slowly spinning is described in the following paragraphs. Two approaches are described. In the first approach, the thruster pulses are timed to be optimal for precession, while the size and direction of the pulses are selected based on a signal that combines both precession and nutation errors. In the second approach, the thruster pulse timing, size and direction are all based on combined precession/nutation error calculations.

In both approaches to simultaneous precession and nutation control, each of the satellite's three axes has a gyro aligned with or parallel thereto. For convenience, these axes will be referred to as the x-axis, the y-axis, and the z-axis. The x-axis is the satellite's nominal spin axis, and the y- and z-axes are perpendicular both to the x-axis and to each other. The control system can apply either positive or negative thruster torque about the z-axis. When the satellite/perigee stage assembly is slowly spinning about the x-axis (for example, at 8 degrees per second), the gyros provide accurate information about the angular motion about all three axes.

Figure 5:
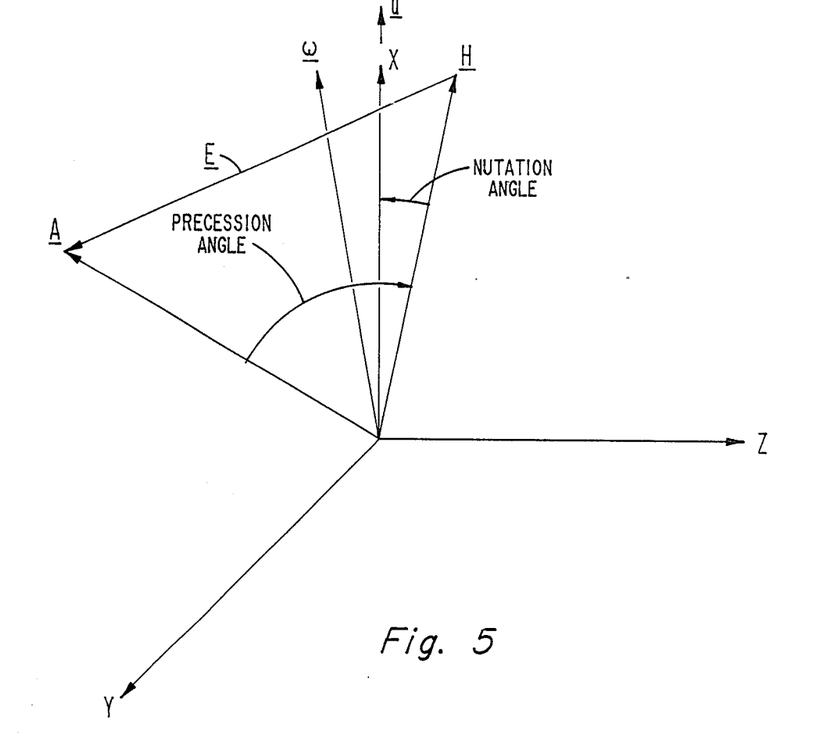
FIG. 5 is a vector diagram illustrating—in body-fixed coodinates at a given instant of time—the target vector A, the angular momentum vector H, etc.

In both approaches to simultaneous precession and nutation control, the spacecraft's computer must calculate the spacecraft/perigee stage assembly's angular momentum vector, H, and the target vector, A. The relationships between these vectors and the satellite-fixed x, y and z coordinates are illustrated in FIG. 5. The target vector, A, is the direction in which the perigee motor is to be fired to inject the satellite into the transfer orbit. This target vector is initialized when the Shuttle is oriented to the perigee stage's correct firing position prior to ejection of the satellite/perigee stage assembly 10 from the Shuttle's cargo bay. Although the target vector is fixed in inertial space, the satellite's rotational motion causes the vector to move continuously relative to the satellite-fixed x, y and z coordinate axes. Thus, the spacecraft's computer must constantly update the target vector using motion information from the gyros.

There are several ways that the satellite's computer can represent and update the target vector, A. Possible means of representation include Euler angles, direction cosine matrices, and quaternions. A quaternion vector is the preferred choice for representing the target vector.

The satellite's computer calculates the angular momentum vector, H, using the matrix equation $H = I\omega$. Here, i is the satellite/perigee stage assembly's inertia matrix, and $\omega$ is the assembly's angular velocity vector. The inertia matrix is determined prior to the Shuttle's launch either by analysis or direct measurement. The angular velocity vector is determined from the satellite's gyro signals. Between thruster pulses, the angular momentum vector's magnitude and orientation in inertial space are essentially constant. Nutational motion, however, causes apparent movement of the angular momentum vector relative to the satellite-fixed x, y and z coordinate axes. Thus, the satellite's computer must constantly update the calculated angular momentum vector using angular rate information from the gyros.

Figure 6:
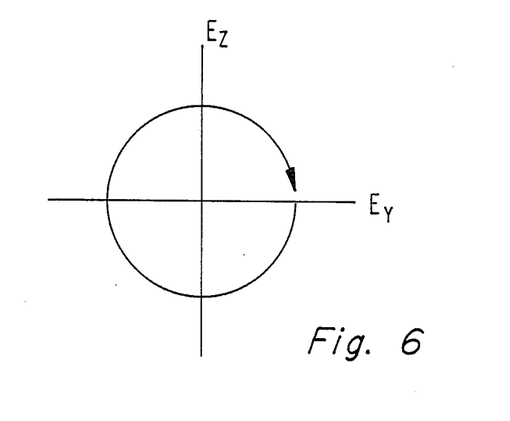
FIG. 6 illustrates the error vector's y-axis and z-axis components in body-fixed coordinates.

The first approach to simultaneous precession and nutation control will now be described. The control system's principle task is to align the satellite/perigee stage assembly's angular momentum vector, H, and x-axis parallel to the target vector, A. The error vector, E, for the basic control is given by the equation $E = A - H$. The satellite's computer uses the error vector's y-axis and z-axis components ($E_y$ and $E_z$) to determine when and for how long to fire the control thrusters. The y-axis component provides timing information for the thruster pulses, and the z-axis component provides pulse duration and sign information. FIG. 6 shows that when $E_y$ and $E_z$ are plotted against each other, the resulting curve is a circular path.

Figure 7:
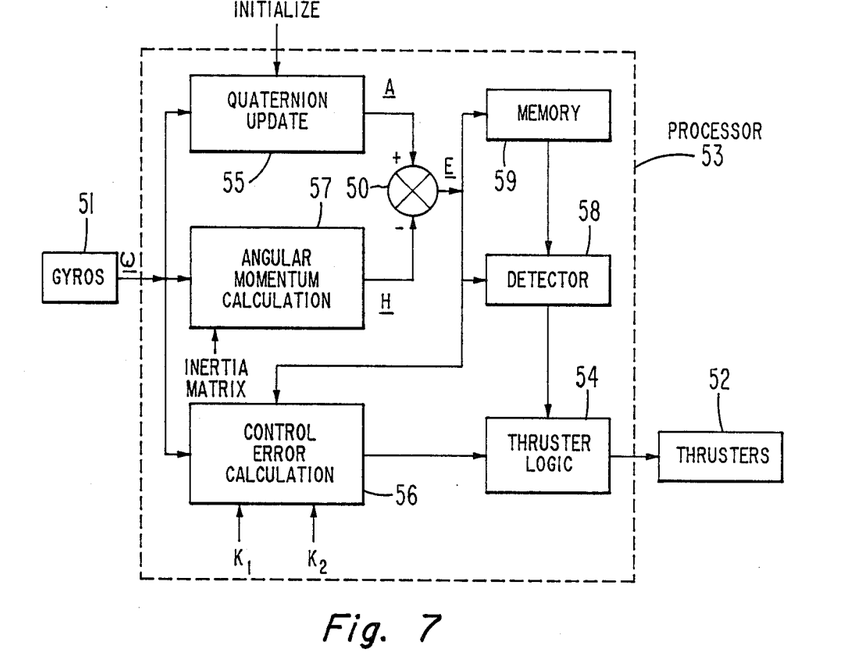
FIG. 7 is a functional block diagram of the basic approach for simultaneous precession control and nutation damping according to one embodiment of the present invention.
Figure 8:
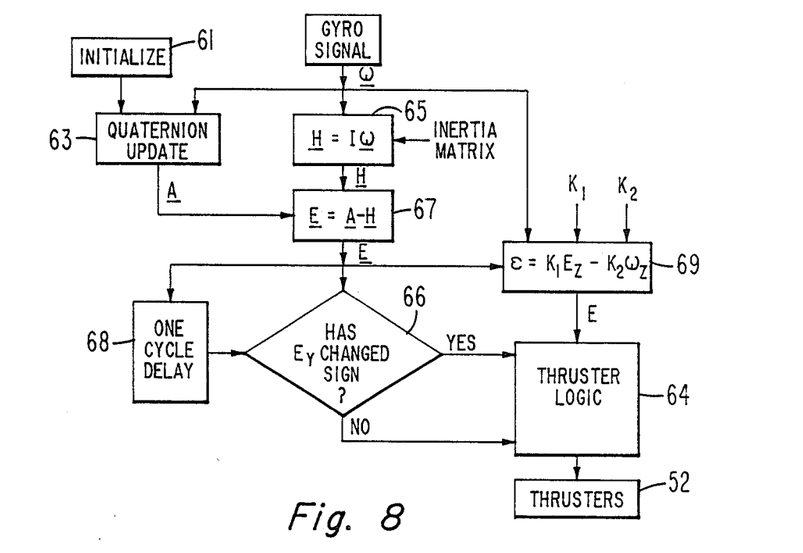
FIG. 8 is a flow chart for the processor in the embodiment of FIG. 7.

As illustrated in FIG. 7, angular motion information from each of the three gyros 51 is applied to the satellite's computer or processor 53. The following five steps for processing the gyro data are repeated at regular intervals (for example, once per second) until the precession and nutation errors have been reduced to essentially zero:

1. The spacecraft's computer calculates the updated target vector, A, and the angular momentum vector, H. The quaternion vector calculation that updates the target vector, A, is represented by block 55 in FIG. 7 and block 63 in the flow chart (FIG. 8). The satellite/perigee stage assembly's angular momentum vector, H, is computed using the gyro rates and the assembly's inertia matrix, as seen in blocks 57 and 65.

2. The error vector, E, is computed by subtracting H from A as represented by summer 50 and 67 in FIGS. 7 and 9.

3. The error vector, E, is stored in memory 59 (storage block 68).

4. The control error is calculated or computed as represented by block 56 of FIG. 7 (block 69 in FIG. 8) according to the equation $\epsilon = K_1 E_z - K_2 \omega_z$, where $K_1$ and $K_2$ are configuration dependent constant, $E_z$ is the z-axis component of E, and $\omega_z$ is the z-axis component of the angular velocity vector. The term $K_1 E_z$ measures the precession error and $K_2 \omega_z$ measures the nutation angle.

5. A detector 58 (decision block 66 in FIG. 8) compares the error vector, E, with the error vector calculated and stored during the preceding computation cycle (one second earlier if the system is operating at 1 hertz). If the error vector's y-axis component, $E_y$, has changed sign since the preceeding cycle, or if $E_y$ is equal to zero, thrusters are fired to apply a z-axis torque pulse with the same sign as $\epsilon$ and with a duration proportional to $|\epsilon|$. The thruster logic 54 (block 64 in FIG. 8) energizes the appropriate thrusters for the appropriate pulse duration. Upper and lower limits on the pulse duration may be imposed by system constraints.

Figure 9:
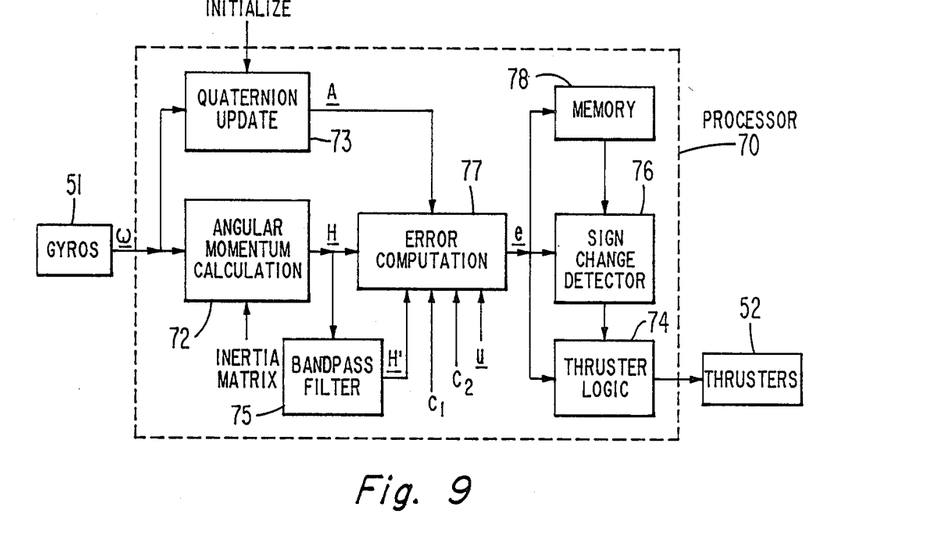
FIG. 9 is a functional block diagram of a second system for providing simultaneous precession control and nutation damping according to a preferred embodiment of the present invention.
Figure 10:
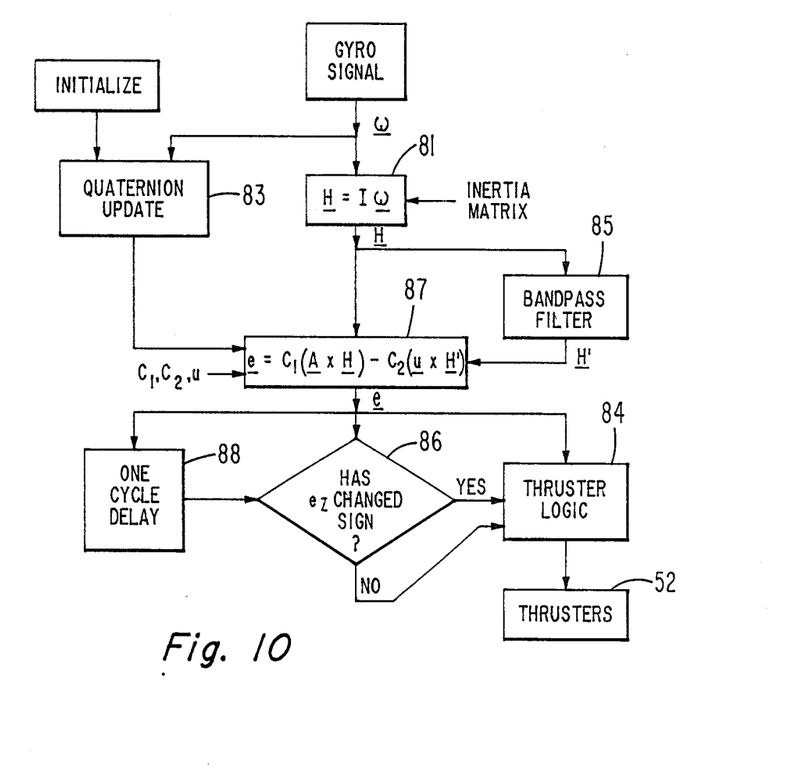
FIG. 10 is a flow chart for the processor in the embodiment of FIG. 9.

A problem inherent in the basic procedure described above is that it will not control nutation when the precession error is essentially zero. Referring to FIGS. 9 and 10, the following improved approach solves this problem. As in the preceiding procedure, the following four steps for processing the gyro data are repeated at regular intervals until the precession and nutation errors have been reduced to essentially zero:

1. As in the procedure described above, the computer or microprocessor 70 processes gyro data from gyros 51 to compute the target vector, A, and the satellite/perigee stage assembly's angular momentum vector, H.

2. The angular momentum vector, H, from block 72 of FIG. 9 (block 81 of FIG. 10) is processed by a bandpass filter represented by block 75 in FIG. 9 and by block 85 in the flow chart of FIG. 10. This filter passes the nutation frequency and removes gyro noise, gyro biases, etc., to produce the filtered angular momentum vector, H'.

3. The error vector, e, is computed at 77 and 87 using the following equation: $e = C_1 (A \times H) - C_2 (u \times H')$, where u is a unit vector parallel to the satellite's x-axis, X denotes the vector cross product, and $C_1$ and $C_2$ are configuration-dependent constants. These constants are based on the satellites/perigee stage assembly's moments of inertia, thruster moment arms and thrust levels, gyro signal levels and characteristics of the system's electronics. Note that both H and H' are applied. The term $C_1(A \times H)$ measures the precession error and $C_2(u \times H')$ measures the nutation angle. The y-axis and z-axis components of e are denoted $e_y$ and $e_z$. In the absence of nutation e is orthogonal to E in FIG. 5.

4. When $e_z$ changes sign, as detected at block 76 in FIG. 9 (represented by decision block 86 in FIG. 10), the appropriate thrusters are fired to apply a z-axis torque pulse with the same sign as $e_y$ and with a duration proportional to $|e_y|$. Upper and lower limits on the pulse duration may be applied to meet system constraints.

What is claimed is:

1. A method of launching from a launch vehicle a spacecraft/perigee motor assembly spinning about a desired spin axis oriented in a desired firing attitude to place said assembly in a desired orbit, said assembly having a computer and gyros on three orthogonal axes comprising the steps of:

orienting the launch vehicle such that the assembly has its perigee motor pointing in said desired firing attitude;

initializing said gyros and attitude determination calculation within said assembly's computer when the launch vehicle is oriented such that the assembly is pointing in said desired firing attitude;

ejecting the assembly from the launch vehicle without spin;

after ejection slowly spinning the assembly about said desired spin axis;

damping the assembly's nutational motion;

precessing the assembly such that the assembly is generally in said desired firing attitude;

simultaneously precessing and nutation damping the slowly spinning spacecraft to align said desired spin axis with initialized assembly attitude by processing the gyro information and firing thrusters;

spinning up the spacecraft/perigee stage assembly to a higher spin rate; and firing the perigee motor to place the assembly in said desired orbit.

2. A method for precessing to a desired firing attitude while simultaneously nutation damping a spinning spacecraft that includes a computer, thrusters for precession and nutation damping and gyros aligned with or parallel to each of the three orthogonal axes of x, y and z with the x-axis being the nominal spin axis wherein said desired firing attitude is stored in said computer comprising the repeatedly applied steps of:

(a) processing the gyro information from the three axes to compute the angular momentum vector, H, and the target vector, A;

(b) computing an error vector $E = A - H$;

(c) storing the error vector E;

(d) comparing the error vector, E, with the error vector calculated and stored during the preceding computation cycle;

(e) calculating control error according to the equation $\epsilon = K_1 E_z - K_2 \omega_z$, where $K_1$ and $K_2$ are configuration dependent constants, $E_z$ is the z-axis component of E, and $\omega_z$ is the z-axis component of the spacecraft's angular velocity vector; and (f) when the error vector's y-axis component, $E_y$, changes sign, firing thrusters to apply a z-axis torque with the same sign as $\epsilon$ and with the duration proportional to $|\epsilon|$.

3. A method for precessing to a desired firing attitude while simultaneously nutation damping a spinning spacecraft that includes a computer, thrusters for precession and nutation damping and gyros aligned with or parallel to each of the three orthogonal axes of x, y, and z with the x-axis being the nominal spin axis wherein said desired firing attitude is stored in said computer comprising the repeatedly applied steps of:

(a) processing the gyros information from the three axes to compute the angular momentum vector, H, and the target vector, A;

(b) bandpass filtering the angular momentum vector, H, to pass the nutation frequency and remove gyro noise, gyro biases, etc., to produce the filtered angular momentum vector, H';

(c) comprising an error vector, e, according to the equation $e = C_1(A \times H) - C_2(u \times H')$, where u is a unit vector parallel to the spacecraft's x-axis, X denotes the vector cross product, and $C_1$ and $C_2$ are configuration-dependent constants;

(d) when the x-axis component, $e_z$, of e changes sign, firing the appropriate thrusters to apply z-axis torque with the same sign as y-axis component, $e_y$, of e and with a duration proportional to $|e_y|$.

4. An apparatus on a satellite for simultaneously precessing and nutation damping a spinning spacecraft comprising:

thrusters for precession and nutation damping, gyros aligned with or parallel to each of three orthogonal axes of x, y and z with the x-axis being the nominal spin axis, means for processing the gyro information from the three axes to compute the angular momentum vector, H, and the target vector, A;

means for computing an error vector according to $E = A - H$;

means for storing representations of the error vector E;

means for comparing the error vector, E, with the error vector calculated and stored during the preceeding computation cycle;

means for calculating a control error according to the equation $\epsilon = K_1 E_z - K_2 \omega_z$, where $K_1$ and $K_2$ are configuration dependent constants, $E_z$ is the z-axis component of E, and $\omega_z$ is the z-axis component of the spacecraft's angular velocity vector; and means made operative when the error vector's y-axis component, $E_y$, changes sign for firing said thrusters to apply a z-axis torque with the same sign as $\epsilon$ and with a duration proportional to $|\epsilon|$.

5. An apparatus for simultaneously precessing and nutation damping a spinning spacecraft comprising:

thrusters for precession and nutation damping, gyros aligned with or parallel to each of the three orthogonal axes x, y and z with the x-axis being the nominal spin axis, and means for processing the gyro information from the three axes to compute the angular momentum vector, H, and the target vector A;

a bandpass filter responsive to the angular momentum vector, H, to pass the nutation frequency and remove gyro noise, gyro biases, etc., to produce a filtered angular momentum vector, H';

means for computing an error vector, e, according to the equation $e = C_1(A \times H) - C_2(u \times H')$, where u is a unit vector parallel to the spacecraft's x-axis, X denotes the vector cross product, and $C_1$ and $C_2$ are configuration-dependent constants; and means made operative when the z-axis component, $e_z$, of e changes sign, for firing the appropriate thrusters to apply z-axis torque with the same sign as the y-axis component, $e_y$, of e and with a duration proportional to $|e_y|$.

* * * * *

UNITED STATES PATENT AND TRADEMARK OFFICE
CERTIFICATE OF CORRECTION

PATENT NO. : 4,758,957

DATED : July 19, 1988

INVENTOR(S) : Hubert et al.

It is certified that error appears in the above-identified patent and that said Letters Patent is hereby corrected as shown below:

Column 2, line 16, "coodinates" should be --coordinates--.

Column 3, line 45, "systemthat" should be --system that--.

Column 4, line 48, "i" should be --I--.

Column 5, line 24, "and 9." should be --and 8.--.

Column 5, line 30, "constant" should be --constants--.

Column 5, line 51, "preceiding" should be --preceding--.

Column 7, line 21, "comprising" should be --computing--.

Column 7, line 27, "x-axis" should be --z-axis--.

Signed and Sealed this

Seventeenth Day of January, 1989

Attest:

DONALD J. QUIGG

Attesting Officer

Commissioner of Patents and Trademarks